(12) United States Patent
Kim et al.

(10) Patent No.: US 9,010,888 B2
(45) Date of Patent: Apr. 21, 2015

(54) REFRIGERATOR AND ANTI-INSECT UNIT FOR REFRIGERATOR

(71) Applicants: Minsup Kim, Changwon-si (KR);
Kyungeun Lee, Changwon-si (KR);
Myungdong You, Changwon-si (KR);
Sunyoung Park, Changwon-si (KR)

(72) Inventors: Minsup Kim, Changwon-si (KR);
Kyungeun Lee, Changwon-si (KR);
Myungdong You, Changwon-si (KR);
Sunyoung Park, Changwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/674,466

(22) Filed: Nov. 12, 2012

(65) Prior Publication Data

US 2013/0119848 A1    May 16, 2013

(30) Foreign Application Priority Data

Nov. 11, 2011  (KR) .................. 10-2011-0117304

(51) Int. Cl.

| | | |
|---|---|---|
| *A01M 29/34* | (2011.01) | |
| *A01M 1/20* | (2006.01) | |
| *A47B 91/02* | (2006.01) | |
| *A47B 91/14* | (2006.01) | |
| *D06F 39/12* | (2006.01) | |
| *F25D 23/02* | (2006.01) | |
| *F25D 23/12* | (2006.01) | |

(52) U.S. Cl.
CPC ............. *A01M 1/2011* (2013.01); *A47B 91/02* (2013.01); *A47B 91/14* (2013.01); *D06F 39/125* (2013.01); *A01M 29/34* (2013.01); *F25D 23/028* (2013.01); *F25D 23/12* (2013.01)

(58) Field of Classification Search
CPC ...... A47B 91/02; A47B 91/14; F25D 23/028; F25D 23/12; A01M 1/2011; A01M 29/34; D06F 39/125
USPC ................. 312/351.1, 351.3, 352; 248/188.2, 248/188.4, 188.8, 226.11, 230.1, 230.5, 248/230.6, 214, 677; 49/109
See application file for complete search history.

(56) References Cited

U.S. PATENT DOCUMENTS

| | | | | |
|---|---|---|---|---|
| 3,356,327 | A * | 12/1967 | Schreyer et al. ........... | 248/188.4 |
| 4,034,518 | A * | 7/1977 | Trecker ............................. | 5/114 |
| 5,148,626 | A * | 9/1992 | Haake, Sr. ...................... | 43/121 |
| 5,353,556 | A * | 10/1994 | Hand et al. ...................... | 52/101 |
| 5,996,531 | A * | 12/1999 | Anderson ................... | 119/61.53 |
| 6,167,840 | B1 * | 1/2001 | White et al. ............... | 119/61.53 |
| 6,915,761 | B1 * | 7/2005 | Campbell ................... | 119/51.01 |
| 2001/0042338 | A1 | 11/2001 | Jackson .......................... | 43/121 |
| 2005/0257555 | A1 * | 11/2005 | Yun et al. ........................ | 62/295 |
| 2005/0279895 | A1 * | 12/2005 | Lee et al. .................... | 248/188.8 |
| 2006/0131466 | A1 * | 6/2006 | Cha et al. .................... | 248/188.8 |
| 2009/0056636 | A1 * | 3/2009 | Deese et al. ................ | 119/61.53 |
| 2009/0282728 | A1 * | 11/2009 | McKnight et al. ............... | 43/109 |
| 2011/0107654 | A1 * | 5/2011 | Wieler ............................ | 43/131 |
| 2012/0117856 | A1 * | 5/2012 | Cefalu et al. .................... | 43/131 |

FOREIGN PATENT DOCUMENTS

| | | | | |
|---|---|---|---|---|
| CN | 100362299 C | 1/2008 | | |
| JP | 07282339 A | * 10/1995 | ............... | G06F 9/10 |

* cited by examiner

*Primary Examiner* — Daniel J Troy
*Assistant Examiner* — Ryan A Doyle
(74) *Attorney, Agent, or Firm* — McKenna Long & Aldridge LLP

(57) ABSTRACT

A refrigerator and an anti-insect unit accommodating a repellent and installed on a refrigerator leg for supporting a refrigerator cabinet, thereby repelling or eradicating insects from the refrigerator and a space for accommodating the refrigerator.

6 Claims, 5 Drawing Sheets

REFRIGERATOR AND ANTI-INSECT UNIT FOR REFRIGERATOR

CROSS-REFERENCE TO RELATED APPLICATIONS

The present application claims the benefit of priority under 35 U.S.C. 119 to Korean Patent Application No. 10-2011-0117304 filed on Nov. 11, 2011 which is hereby incorporated by reference in its entirety.

BACKGROUND

Embodiments relate to a refrigerator and an anti-insect unit for the refrigerator.

Refrigerators include an inner storage space that is closed by a door to store food at a low temperature. The inner storage space is cooled by cold air generated through heat exchange with refrigerant circulating according to a refrigeration cycle. Accordingly, food can be optimally stored in the inner storage space.

Such a refrigerator may include a refrigerating compartment and a freezing compartment therein, and shelves, drawers, and baskets may be accommodated in the refrigerating compartment and the freezing compartment. The refrigerating compartment and the freezing compartment are closed by doors. Refrigerators can be variously classified according to the arrangements of refrigerating compartments and the freezing compartments, and the forms of doors.

Along with the change of people's eating patterns and preference, large and multifunctional refrigerators have been introduced, and various comfortable structures have been added to refrigerators.

Refrigerators are substantially disposed in spaces for storing and cooking food, such as kitchens and restaurants. Such spaces for accommodating refrigerators are vulnerable to insects such as roaches and ants, and thus periodically require repellents for eradicating insects.

To this end, Korean Patent Publication No. 10-2004-0050785 discloses a configuration, which includes an inlet anti-insect unit and an outlet anti-insect unit on a passage through which a machinery room communicates with the outside thereof, thereby preventing insects from getting into the machinery room or living therein.

However, such configurations are applied to only machinery rooms, and fail to prevent insects from getting into a space in which a refrigerator is accommodated. Also, such configurations substantially fail to eradicate insects and drive away insects.

SUMMARY

Embodiments provide a refrigerator and an anti-insect unit accommodating a repellent and installed on a refrigerator leg for supporting a refrigerator cabinet, thereby repelling or eradicating insects from the refrigerator and a space for accommodating the refrigerator.

In one embodiment, a refrigerator includes: a cabinet forming a storage space that is opened and closed by a door; a leg installed on a bottom surface of the cabinet to space the cabinet away from a ground; and an anti-insect unit disposed on the leg and to accommodate a repellent for repelling or eradicating insects.

The leg may be provided in plurality at front left and right corners of the bottom surface of the cabinet.

The anti-insect unit may be removably installed on the leg.

The anti-insect unit may include a first member and a second member, which are rotatably connected to each other, wherein when the first and second members are coupled to each other, the first and second members are fixed to surround an outer surface of the leg.

The leg may pass through the anti-insect unit, and a repellent accommodation space, which is open upward, may be disposed in the anti-insect unit.

The leg may include: a support part to contact the ground; an installation part extending upward from the support part, wherein the anti-insect unit is placed on the support part and installed at the installation part.

The anti-insect unit may be removably installed around the installation part.

The leg may be configured to adjust a distance between the cabinet and the ground, and the anti-insect unit may be lower than the installation part.

In another embodiment, an anti-insect unit for a refrigerator includes: a first member forming a portion of a repellent accommodation space in which a repellent for repelling or eradicating insects is accommodated; and a second member having a shape corresponding to the first member to form a remaining part of the repellent accommodation space, and coupled to the first member, wherein when the first member is coupled to the second member, an installation hole part through which a leg of the refrigerator passes is formed between the first and second members.

The first member may be coupled to the second member to form a cylindrical shape, and the repellent accommodation space may be disposed outside of the installation hole part.

The first member may include: an outer wall forming an outer surface of the first member; an inner wall spaced apart from the outer wall; and a lower surface connecting the outer wall to the inner wall and defining the repellent accommodation space with the outer wall and the inner wall.

The inner wall may be lower than the outer wall.

The outer wall may be lower than the leg.

An end of the first member may contact an end of the second member, and shaft join parts may be disposed on the ends of the first and second members, respectively, and the first and second members may be rotatably connected to each other through a rotation shaft passing through the shaft join parts.

Locking parts may protrude from ends of the first and second members, and lock with each other when the first member is coupled to the second member.

The details of one or more embodiments are set forth in the accompanying drawings and the description below. Other features will be apparent from the description and drawings, and from the claims.

DETAILED DESCRIPTION OF THE EMBODIMENTS

Hereinafter, exemplary embodiments will be described with reference to the accompanying drawings. Refrigerators exemplified herein are bottom freezer type refrigerators in which a refrigerating compartment is disposed over a freezing compartment.

Although bottom freezer type refrigerators are exemplified for convenience in description and understanding, the present disclosure is not limited thereto, and thus, can be applied to any refrigerators including a leg.

Figure 1:
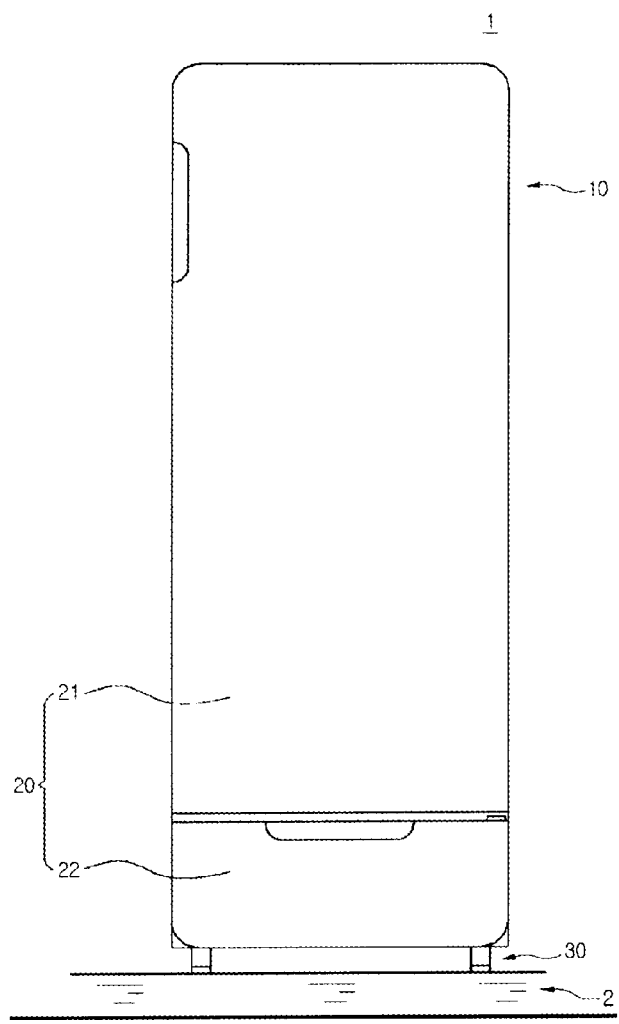
FIG. 1 is a front view illustrating a refrigerator according to an embodiment.

FIG. 1 is a front view illustrating a refrigerator according to an embodiment.

Referring to FIG. 1, the refrigerator 1 according to the current embodiment includes a cabinet 10 and a plurality of doors 20 to form the entire appearance thereof. The cabinet 10 includes a storage space in an approximately rectangular parallelepiped shape. The doors 20 are installed on the cabinet 10 and correspond to an open front of the storage space.

The storage space of the cabinet 10 may be divided into upper and lower parts, which form spaces for storing food at different temperatures, respectively. The spatial arrangement of the storage space of the cabinet 10 may be varied depending on the structure and shape of the refrigerator 1.

The doors 20 are configured to open and close the storage spaces, and the number thereof corresponds to the number of storage spaces formed by partitioning the cabinet 10. In this case, the doors 20 may be configured to individually and selectively open and close two storage spaces.

For example, the doors 20 may include a first door 21 disposed in the upper part of the cabinet 10 and rotatably installed on the cabinet 10. The first door 21 may rotate to open and close a storage space of the cabinet 10.

The doors 20 may include a second door 22 in the lower part of the cabinet 10. The second door 22 is selectively inserted into and withdrawn from the cabinet 10. The second door 22 may be provided in the form of a drawer, and may slide in and out of the cabinet 10 to open and close the other storage space of the cabinet 10.

Legs 30 may be disposed on the bottom surface of the cabinet 10. The legs 30 space the refrigerator 1 away from a ground on which the refrigerator 1 is installed, and may be disposed at corners of the bottom surface of the cabinet 10.

When the cabinet 10 has four corners on the bottom surface thereof, the legs 30 may be disposed on at least the front corners of the four corners, and rollers (not shown) for moving the refrigerator 1 may be disposed on the rear corners of the four corners. Alternatively, the legs 30 may be provided on all of the four corners.

The structure of the legs 30 will now be described in more detail with reference to the accompanying drawings.

Figure 2:
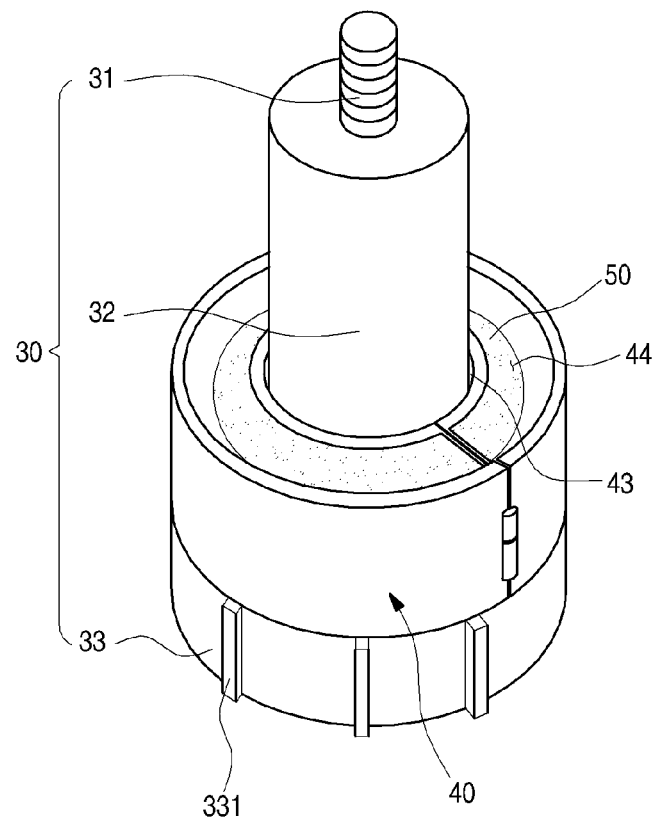
FIG. 2 is a perspective view illustrating a leg on which an anti-insect unit is installed according to another embodiment.
Figure 3:
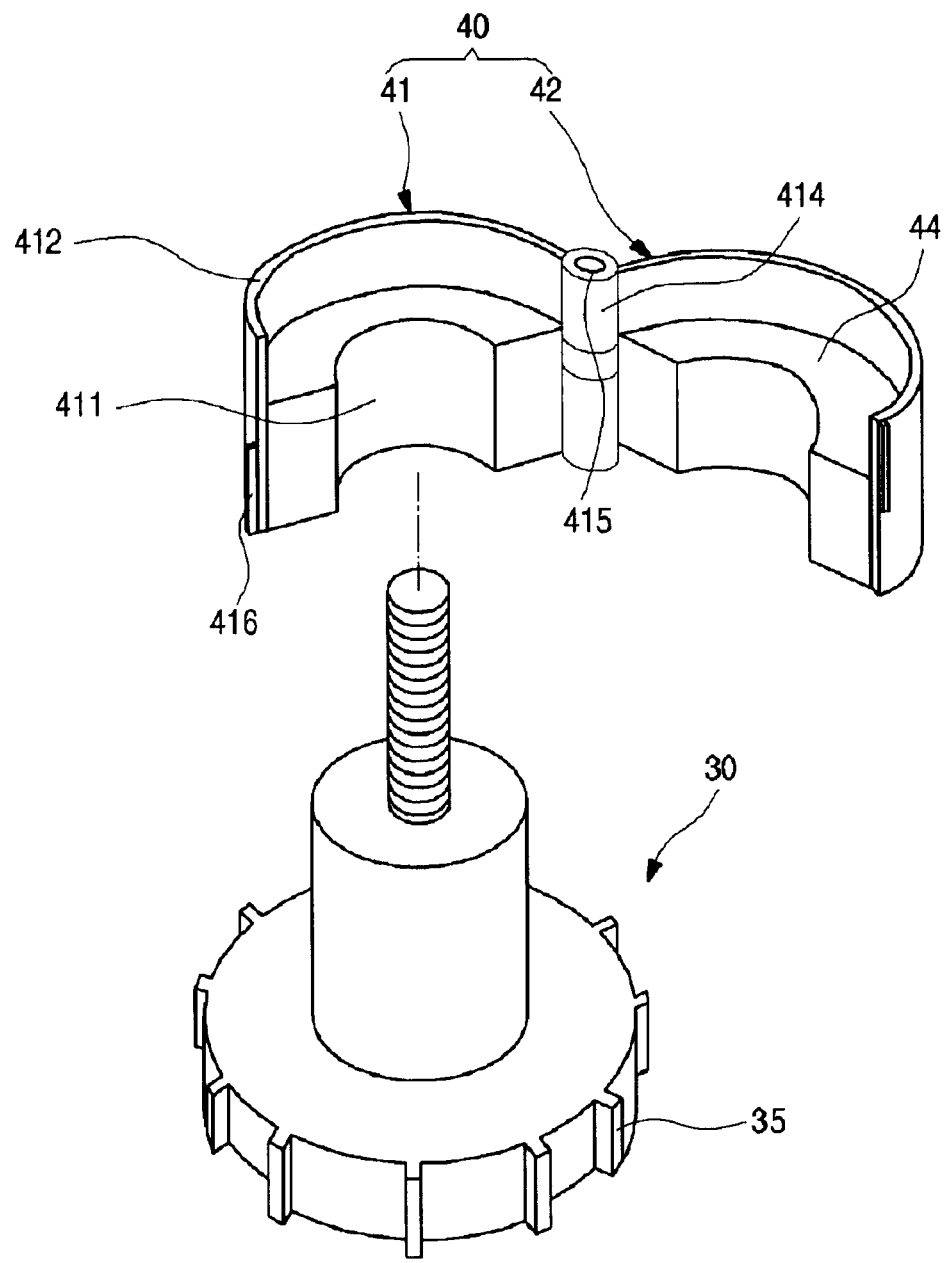
FIG. 3 is an exploded perspective view illustrating the leg and the anti-insect unit of FIG. 2.
Figure 4:
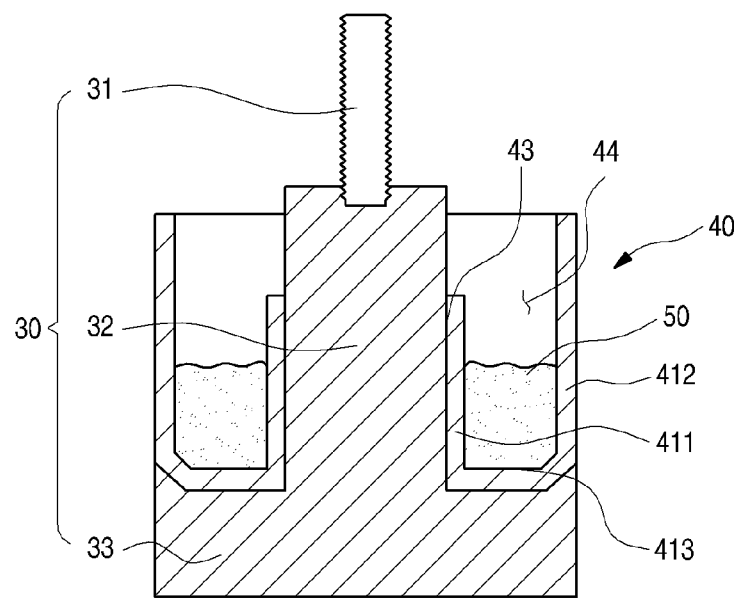
FIG. 4 is a cross-sectional view illustrating the leg and the anti-insect unit of FIG. 2.

FIG. 2 is a perspective view illustrating a leg on which an anti-insect unit is installed according to an embodiment. FIG. 3 is an exploded perspective view illustrating the leg and the anti-insect unit of FIG. 2. FIG. 4 is a cross-sectional view illustrating the leg and the anti-insect unit of FIG. 2.

Referring to FIGS. 2 to 4, the leg 30 may include: a fixing part 31 for fixing the leg 30 to the bottom surface of the cabinet 10; an installation part 32 on which an anti-insect unit 40 to be described later is installed; and a support part 33 to contact a ground and support the cabinet 10. The installation part 32 and the support part 33 may be integrally formed of a plastic material through injection molding. The fixing part 31 may be formed of metal and installed on top of the installation part 32.

The fixing part 31, which has a bar shape with a screw thread on the outer circumferential surface thereof, constitutes the upper part of the leg 30 and has a predetermined length. Thus, the fixing part 31 may be fixedly screwed to the bottom surface of the cabinet 10, and the level of the cabinet 10 may be adjusted depending on a coupling degree of the fixing part 31 with the cabinet 10. That is, the length of the leg 30 installed on the cabinet 10 and protruding therefrom may be varied depending on a number of rotations of the fixing part 31 with the installation part 32, thereby adjusting the level of the cabinet 10 or leveling the cabinet 10.

The installation part 32 has a cylindrical shape with a diameter greater than that of the fixing part 31 and smaller than that of the support part 33. The installation part 32 may have a height greater than that of the anti-insect unit 40. Thus, when the anti-insect unit 40 is installed on the installation part 32, the upper portion of the installation part 32 is exposed. The installation part 32 has an outer diameter corresponding to an inner diameter of the anti-insect unit 40, so that the anti-insect unit 40 can be installed on the installation part 32.

The support part 33 is disposed at the lower end of the installation part 32, and has a diameter greater than that of the installation part 32. The support part 33 may have a size corresponding to an outer diameter of the anti-insect unit 40. The support part 33 may have an outer diameter equal to the outer diameter of the anti-insect unit 40. Thus, when the anti-insect unit 40 is installed on the installation part 32, the support part 33 and the anti-insect unit 40 provide a sense of unity.

Rib parts 331 may be disposed in an outer portion of the support part 33 to efficiently rotate the support part 33. The rib parts 331 may be recessed or protrude from the support part 33 and be arrayed around the support part 33. Reinforcing ribs 35 may be disposed in the rib parts 331 or the support part 33.

The anti-insect unit 40 has an inner space in which a repellent for repelling or eradicating insects are accommodated, and is removably installed on the installation part 32.

In particular, the anti-insect unit 40 may have a cylindrical shape, and includes: an installation hole part 43 in the central part thereof; and a repellent accommodation space 44 disposed outside of the installation hole part 43. The installation hole part 43 may have a diameter corresponding to the diameter of the installation part 32. The anti-insect unit may have an outer diameter corresponding to that of the support part 33.

Thus, when the anti-insect unit 40 is installed on the installation part 32, an outer surface of the installation part 32 contacts an inner surface of the installation hole part 43, and an outer surface of the anti-insect unit 40 is flush with an outer surface of the support part 33.

The anti-insect unit 40 may include a first member 41 and a second member 42 at the left and right sides thereof, and has a cylindrical shape, as a whole, by coupling the first and second members 41 and 42. The repellent accommodation space 44 of the anti-insect unit 40 is open upward to accommodate a repellent and lure insects therein, thereby eradicating insects.

The first and second members 41 and 42 are symmetrical to each other. Thus, the first member 41 will now be principally described, and a description of the second member 42 will be omitted.

The first member 41 may have a half-circular shape in plan view, and include an outer wall 412, an inner wall 411, and a lower surface 413. The outer wall 412 forms an outer surface of the first member 41 and has a predetermined height. The outer wall 412 has a half-circular shape, and is coupled to the second member 42 to form a cylinder.

The inner wall 411 is spaced inward from the outer wall 412, and has a half-circular shape in plan view. When the first member 41 is coupled to the second member 42, the inner wall 411 forms the installation hole part 43. The inner wall 411 is lower than the outer wall 412, and forms an upper limit line of a region in which a repellent for eradicating insects are accommodated.

The lower surface 413 connects the outer wall 412 and the inner wall 411 to each other, and forms a bottom surface of the anti-insect unit 40.

Thus, the outer wall 412, the inner wall 411, and the lower surface 413 provide the first member 41 with the repellent accommodation space 44 in which a repellent 50 for eradicating insects are accommodated. The repellent 50 may be curcuma or a commercialized repellent, and may be provided in the form of powder, gel, or solid within the repellent accommodation space 44.

A shaft join part 414 may be disposed on an end of the outer wall 412 of the first and second members 41 and 42. The first and second members 41 and 42 are rotatably coupled to each other by the shaft join parts 414 thereof. At this point, the shaft join parts 414 are aligned in a line, so that a hinge part 415 can pass through the shaft join parts 414.

A locking part 416 is disposed on the outer wall 412 at the opposite end of the shaft join part 414. The locking parts 416 of the first and second members 41 and 42 may be disposed in upper and lower regions of the respective outer walls 412 corresponding to each other. Thus, when the first and second members 41 and 42 are coupled to each other, the locking parts 416 contact and lock to each other.

The locking parts 416 may have hook-shaped ends that hook and lock the corresponding ends of the first and second members 41 and 42 without coupling between the locking parts 416. That is, the locking part 416 of the first member 41 may hook and lock the corresponding end of the second member 42, and the locking part 416 of the second member 42 may hook and lock the corresponding end of the first member 41.

Hereinafter, a process of installing an anti-insect unit on a leg of a refrigerator configured as described according to the current embodiment will now be described.

Figure 5:
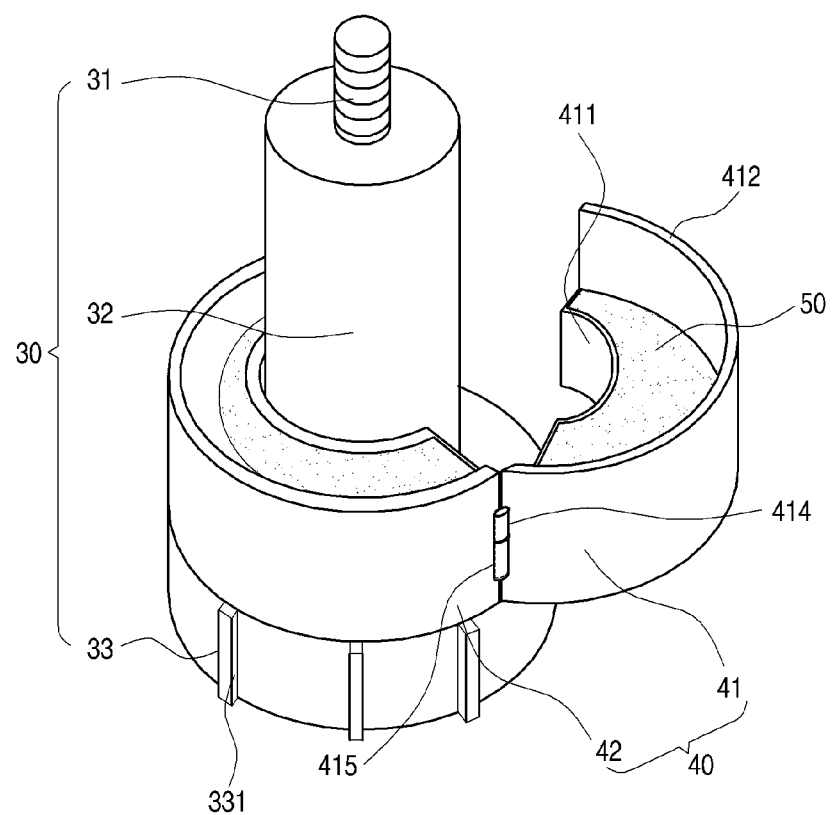
FIG. 5 is a perspective view illustrating an installation/removal state of the anti-insect unit of FIG. 2.

FIG. 5 is a perspective view illustrating an installation/removal state of the anti-insect unit of FIG. 2.

Referring to FIG. 5, the anti-insect unit 40 may be installed on the leg 30 before the leg 30 is installed on the cabinet 10, so that the leg 30 provided with the anti-insect unit 40 can be installed on the cabinet 10. Alternatively, the anti-insect unit 40 may be installed on the leg 30 after the leg 30 is installed on the cabinet 10.

The repellent 50 is put in the repellent accommodation space 44 of the anti-insect unit 40, and then, the first and second members 41 and 42 are spread out to be disposed on the installation part 32 of the leg 30. At this point, the first and second members 41 and 42 are rotated through the hinge part 415 and connected to each other.

The first and second members 41 and 42 are disposed on the left and right sides of the installation part 32, and are then coupled to each other. The installation part 32 passes through the installation hole part 43 formed by the coupling of the first and second members 41 and 42, and the inner wall 411 tightly contacts the outer surface of the installation part 32.

The locking parts 416 are coupled to each other, to thereby lock and fix the first and second members 41 and 42 to each other. Accordingly, the first and second members 41 and 42 are maintained in a cylindrical shape. Then, the state that the anti-insect unit 40 is installed on the installation part 32 is maintained.

After that, when replacement or supplement of the repellent 50 accommodated in the repellent accommodation space 44 is needed, or a large number of insects are collected therein, the anti-insect unit 40 is removed from the leg 30.

To this end, the locking parts 416 are manipulated to unlock the first and second members 41 and 42, and the first and second members 41 and 42 are rotated to be removed from the installation part 32.

After replacement or supplement of the repellent 50, and/or cleaning of the repellent accommodation space 44, the anti-insect unit 40 is installed again on the leg 30 as described above. Thus, the anti-insect unit 40 can be repeatedly used.

According to the embodiments, an anti-insect unit accommodating a repellent is installed on a leg of a refrigerator to remove insects from the refrigerator and from a space for accommodating the refrigerator. In addition, insects are substantially and effectively repelled or eradicated by the repellent.

Thus, a space for storing and treating food can be maintained in more clean and hygienic conditions.

In addition, the anti-insect unit installed on the leg is not substantially exposed to the outside, and is thus hygienically and visually clean.

In addition, since the anti-insect unit is removably installed on the leg, the old repellent can be replaced with a new repellent. Thus, the anti-insect unit can be repeatedly used.

In addition, the anti-insect unit can be applied to any refrigerator, provided that a leg has a diameter corresponding to the inner diameter of the anti-insect unit, regardless of configurations of commercialized refrigerators.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A refrigerator comprising:
a cabinet;
a leg installed on a bottom surface of the cabinet to space the cabinet away from a ground, the leg including:
    a fixing part coupled to the cabinet and having a screw thread on an outer circumferential surface thereof,
    an installation part coupled to the fixing part and having a first circular diameter,
    a support part extending from the installation part and having a second circular diameter greater than the first circular diameter,
    a rib part projecting from an outer circumferential surface of the support part and having a third circular diameter to facilitate a rotating operation of the support plate by a user, and
    an anti-insect unit coupled to the installation part and configured to accommodate a repellent for repelling or eradicating insects, the anti-insect unit including:
        an inner wall that surrounds an outer circumferential surface of the installation part, an outer wall that is spaced apart from the inner wall and has a fourth circular diameter,
        a bottom wall that extends from a lower part of the inner wall and the outer wall, and is supported by an upper surface of the support part, and an accommodation space that is defined by the inner wall, the outer wall, and the bottom wall, and is opened upward to receive the repellent and lure insects therein, wherein the anti-insect unit includes;
- a first member forming a first half portion of the accommodation space;
- a second member forming a second half portion of the accommodation space;
- a hinge part coupling first ends of the first and second members, the first and second members configured to be rotatably coupled to each other by the hinge part;
- a locking part provided in second ends of the first and second members, the second ends configured to be opposite ends of the first ends, the locking part configured to selectively couple the second ends of the first and second members,
- wherein the forth circular diameter is substantially the same as the second circular diameter, such that outer surfaces of the anti-insect unit and the support part form a coplanar surface, wherein a distance between the anti-insect unit and a bottom end of the cabinet is variable according to the rotation of the leg for leveling the cabinet, and an upper end of the inner wall is lower than an upper end of the outer wall to prevent the repellent from overflowing when rotating the support part.

2. The refrigerator according to claim 1, wherein the leg is provided in plurality at front left and right corners of the bottom surface of the cabinet.

3. The refrigerator according to claim 1, wherein the anti-insect unit is removably installed on the leg.

4. The refrigerator according to claim 1, wherein the anti-insect unit has a cylindrical shape and a height of the anti-insect part is lower than a height of the installation part.

5. The refrigerator according to claim 1, wherein the installation part and the support part are integrally formed of a plastic material.

6. The refrigerator according to claim 1, wherein the outer wall is lower than a top part of the leg.

* * * * *